Dec. 20, 1949     V. A. RAYBURN     2,492,065
SCRUBBER FOR RUBBER BALES
Filed Dec. 8, 1942     2 Sheets-Sheet 1
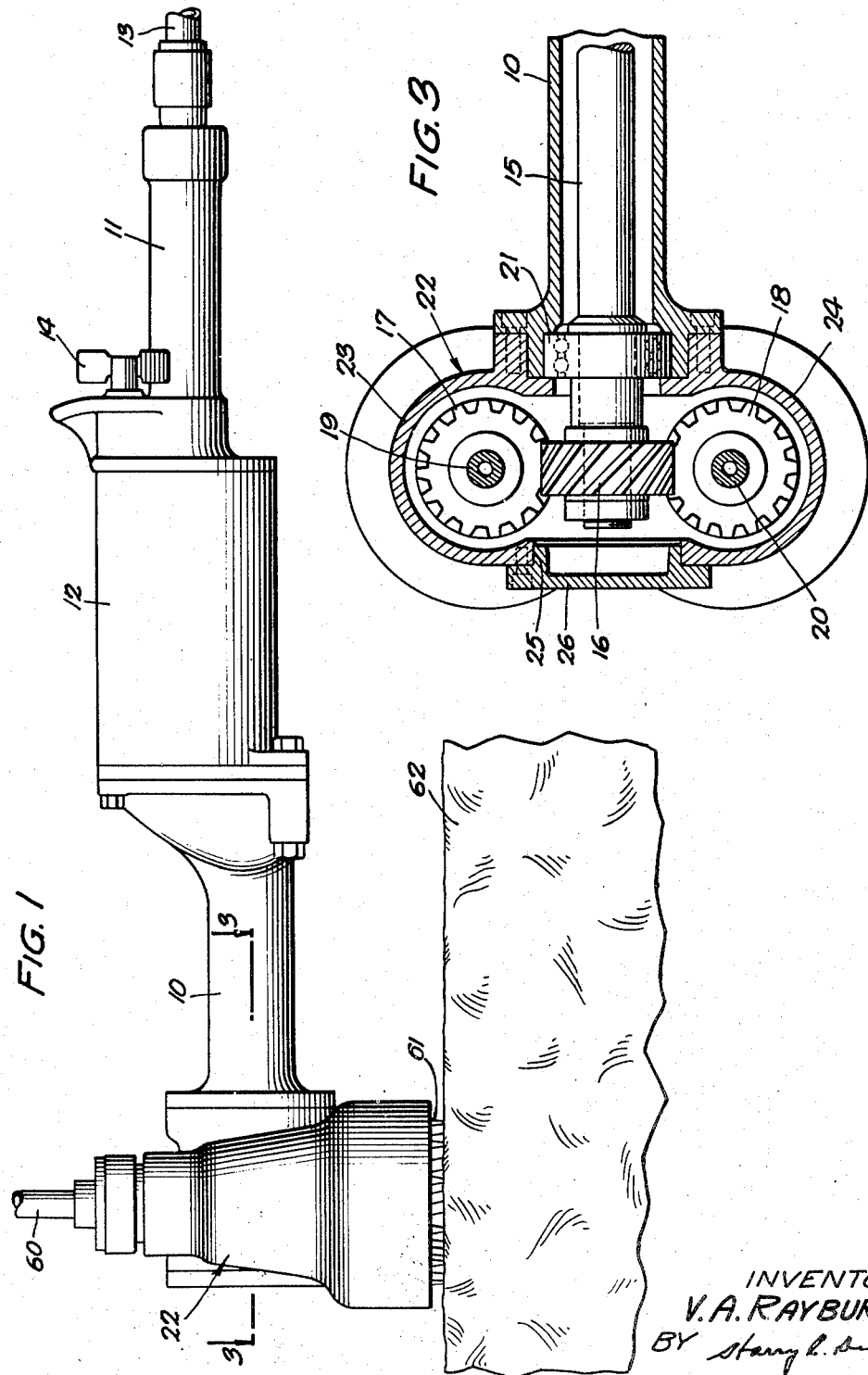
INVENTOR
V. A. RAYBURN
BY
ATTORNEY

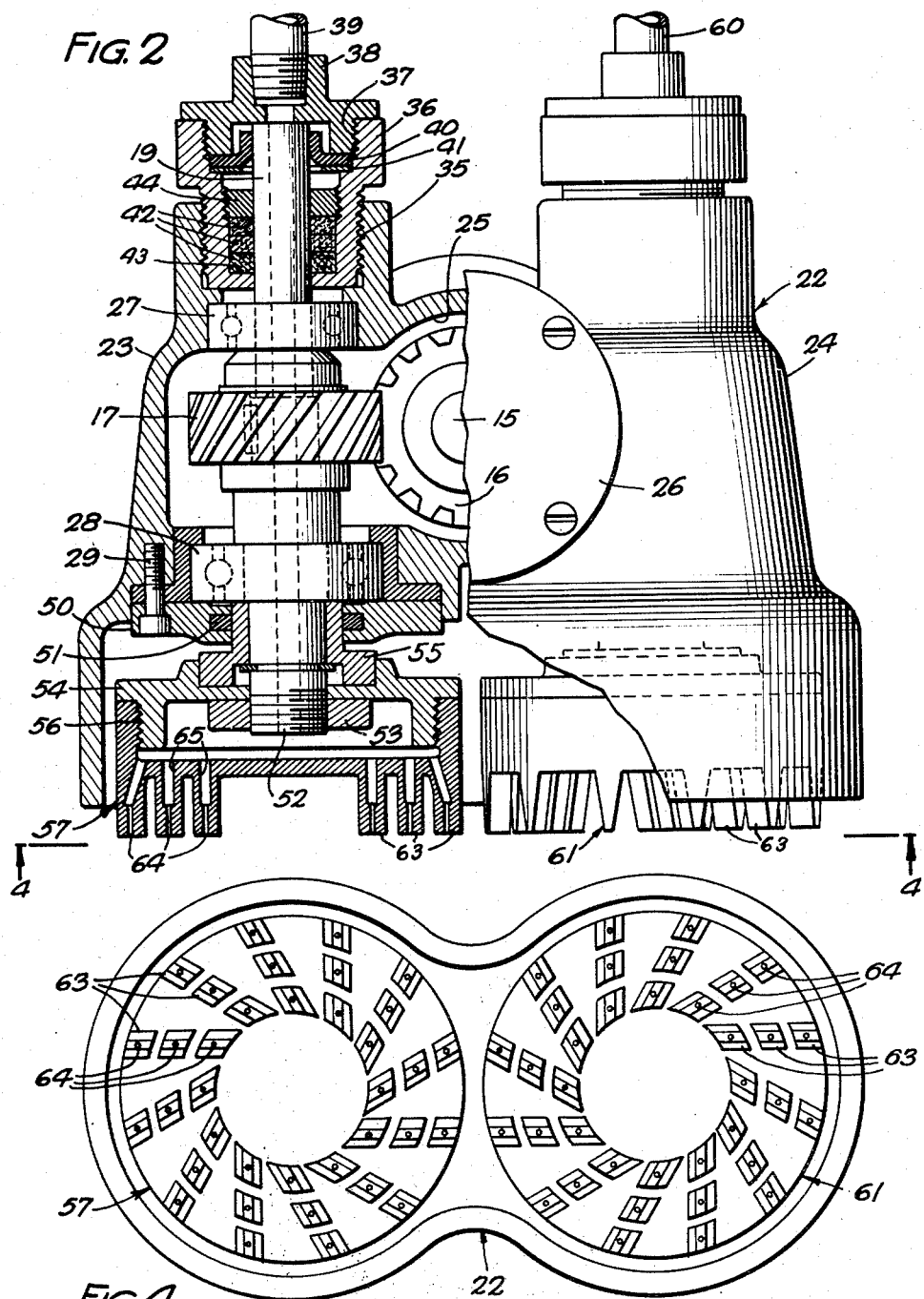

Patented Dec. 20, 1949

2,492,065

UNITED STATES PATENT OFFICE 2,492,065

SCRUBBER FOR RUBBER BALES

Vincent A. Rayburn, Baltimore, Md., assignor to Western Electric Company, Incorporated, New York, N. Y., a corporation of New York Application December 8, 1942, Serial No. 468,213

3 Claims. (Cl. 15—93)

1

This invention relates to scrubbers for elastic articles and more particularly to apparatus for scrubbing crude rubber bales.

It is common practice to ship crude rubber in wooden containers and, in the handling of the rubber, slivers from the containers and other pieces of foreign matter become attached to the rubber, which, unless maintained wet, is tacky. In the ordinary manufacture of rubber articles, these foreign particles are not objectionable, but when the rubber is to be used as a high grade insulator, the particles of foreign matter must be removed from the rubber and heretofore this has been done by stripping the wrapper sheet from the bale and treating it in a scrubbing apparatus in which water is utilized to flush away the foreign matter while rolls work the rubber.

An object of the invention is to provide new and improved scrubbers for elastic articles.

Another object of the present invention is to provide an effective and simple apparatus for quickly cleaning foreign matter from the surfaces of crude rubber bales.

In accordance with one embodiment of the invention, there is provided a hand manipulated pneumatically driven twin head rotary comb wherein the teeth of the comb are hollow and are supplied with water under pressure to supply water for flushing foreign particles disturbed by the combs during their rotation and flush them from the surface of the rubber as well as to lower the friction between teeth of the comb and the surface of the rubber bale.

A better understanding of the invention may be had by reference to the following detailed description when considered in conjunction with the accompanying drawing, wherein Fig. 1 is a side elevational view of an apparatus embodying the present invention showing the apparatus being used to clean a bale of crude rubber;

Fig. 2 is an end elevational view, partly in section, showing the details of the drive mechanism for the combs and the means for supplying water to the hollow teeth of the combs;

Fig. 3 is a fragmentary horizontal sectional view, taken substantially along the line 3—3 of Fig. 1 in the direction of the arrows showing the drive connections in plan; and Fig. 4 is a face view of the combs taken substantially along the line 4—4 of Fig. 2 in the direction of the arrows.

Referring to the drawings, wherein like reference characters designate the same parts throughout the several views, it will be seen that the apparatus is provided with a front handle 10 and a rear handle 11, whereby the apparatus may be manipulated manually. Intermediate the handles 10 and 11 and connected thereto is a suitable air motor 12 adapted to be supplied with air under pressure for driving it through an air inlet connection 13 which communicates with the motor 12 through the rear handle 11. As is usual in such motors, the speed of rotation thereof may be controlled by a throttle 14 conveniently located near the rear handle 11. The air motor 12 is provided with a drive spindle 15, which extends through and is journalled in the front handle 10. Fixed to the left end (Fig. 3) of the drive spindle 15 is a driving worm 16, which engages and drives a pair of worm gears 17 and 18 in opposite directions. The worm gears 17 and 18 are mounted upon hollow shafts 19 and 20.

The drive spindle 15 is rotatable in a bearing 21 adjacent to the end of the spindle 15 and the bearing 21 is suitably mounted at the end of the front handle 10. Also fixed to the front handle 10 is an irregularly shaped casing 22 comprising a pair of turrets 23 and 24, which enclose and support the shafts 17 and 18, respectively. The casing 22 is provided with a front aperture 25 normally closed by a closure member 26, whereby access may be had to the gear 16 and the end of the drive spindle 15 through the casing 22. Since the shafts 19 and 20 are of exactly the same construction and each of the turrets 23 and 24 have the same equipment mounted in them, only the turret 23 will be described in detail, together with the parts associated with it. Near its upper end, the turret 23 has a bearing 27 (Fig. 2) mounted in it for rotatably supporting the hollow shaft 19 and just below the level of the driving worm 16, a second bearing 28 is provided for rotatably supporting the lower end of the hollow shaft 19. The bearing 28 is held in place in the turret 23 by suitable bolts 29 and the bearings cooperate to support the hollow shaft 19 and prevent it from moving vertically, as viewed in Fig. 2, while permitting it to rotate. The upper end of the turret 23 has internal threads 35 formed in it for receiving a packing sleeve 36, which is, in turn, threaded, as shown at 37, to receive a coupling 38. The coupling 38 has the end of a flexible hose connection 39 threaded into it whereby water under pressure may be directed to the hollow shaft 19. Interposed between the packing sleeve 36 and the coupling 38 are a pair of sealing washers 40 and 41, which serve to seal the hollow shaft 19 and hose connection 39. In addition to the washers 40 and 41, suitable packing material, as shown at 42, is compressed between a shoulder 43 on the packing sleeve 36 and a threaded packing ring 44. In this manner, the hollow shaft 19 is in communication with the hose connection 39 and the bearings and drive mechanism for the shaft are sealed out of communication with the water to be supplied through the hose connection 39 to the hollow shaft 19.

A locking ring 50, which serves to hold the bearing 28 in the lower portion of the turret 23, is also provided with an annular packing ring 51, which bears against a tubular shouldered member 55, which is suitably secured to and surrounds the bottom end of the hollow shaft 19 and will tend to prevent water fed through the shaft 19 from backing up into the bearings and driving apparatus. The lower end of the shaft 19 is threaded, as shown at 52, to receive a lock nut 53, which holds a comb supporting ring 54 against the shouldered member 55 whereby the shouldered member 55 will be forced into engagement with the portion of the bearing 28 which is fixed to the hollow shaft 19 to cause the comb supporting ring 54 to be rotated with the shaft. The comb supporting ring 54 is threaded, as shown at 56, to receive a hardened steel comb, designated generally by the numeral 57, which is preferably corrosion resistant. It will be understood that the construction thus far described in connection with the turret 23 is duplicated in the turret 24, which has a flexible hose connection 60 entering it and in communication with the hollow shaft 20 and that the hollow shaft 20 will conduct fluid forced into it through the hose connection 60 down to a comb 61. The comb 61 is of the same construction as the comb 57, except that the teeth of the combs are disposed oppositely so that when they are used in scrubbing a bale of crude rubber 62 (Fig. 1), the action of one comb will balance the torque action of the other and make the apparatus easier to handle. As will be seen by reference to Figs. 2 and 4, the combs 57 and 61 are provided with a plurality of hollow teeth 63, which extend downwardly. The teeth are provided with ports 64—64, which terminate in passages 65 in communication with the outlet of the hollow shaft 19. The teeth of the comb are arranged in uniform rows along portions of chords with the rows being symmetric to the center of the heads and taper to blunt points whereby, when the combs are rotated, they will, in effect, scrub and stretch the surface of the bale 62 while directing water through their ports 53 onto the bale and the tangential arrangement of the teeth being in opposite directions, there will be very little tendency for the apparatus to "creep" across the surface of the bale 62.

In practicing the invention, water under pressure may be directed through the hose connections 39 and 60 and hollow shafts 19 and 20 to the interior of the combs 57 and 61 and will then be directed out through the ports 64 in the teeth 63 of the combs. Since the rows of teeth 63 on the combs 57 and 61 nearest to each other are being moved away from each other, they stretch the portion of the bale 62 between these teeth to open up any wrinkles and folds in this portion of the bale and the water supplied by the ports 64 in the teeth flushes out the foreign matter previously held in the folds and wrinkles. An operator using the apparatus, after turning on the supply of water to the combs, may adjust the throttle 14 to drive the combs through the action of the spindle 15, driving worm 16 and worm gears 17 and 18 and may then scrub the surfaces of the bale 62. It has been found that the present apparatus cleans the surface of the bale quite thoroughly and apparently the thorough cleaning of the surface is attributable, in great part, to the fact that the oppositely rotating heads stretch a portion of the bale therebetween so that the folds and wrinkles in this portion of the bale are opened and foreign matter previously enclosed therein is washed and scraped therefrom.

What is claimed is:

1. A scrubber for rubber bales, which comprises a pair of hollow discs, a frame for mounting the discs closely and rotatably in a single plane and on parallel axes, means for rotating the discs in opposite directions, means for supplying cleaning fluid under pressure to the interior of the discs, and a plurality of perforated hard steel teeth projecting in uniform, symmetrical rows from the bottoms of the discs, each of said rows of teeth extending from a point near the center of that disc to a point near the periphery thereof, the perforations in the teeth being in communication with the interior of the disc, whereby the cleaning liquid flows through the perforations from the interior of the discs.

2. A scrubber for bales of rubber, which comprises a pair of disc-shaped scrubbing heads, a frame mounting the heads for rotation on closely spaced parallel axes and in substantially the same plane, each scrubbing head having on the bottom thereof a plurality of hard steel teeth provided with passages therethrough, and means for rotating the scrubbing heads in opposite directions, said hard steel teeth being arranged in uniform rows extending inwardly from the peripheries of the scrubbing heads so that some of the rows of teeth on one of the heads are moved away from some of the rows of teeth on the other head to stretch material therebetween, whereby cleaning fluid forced through the passages flushes material stretched by the last-mentioned rows of teeth, said rows being symmetrical with respect to the centers of the heads.

3. A scrubber for rubber bales, which comprises a pair of hollow scrubbing discs, a frame for mounting the discs for rotation on closely spaced parallel axes and in a single plane, means for rotating the discs in opposite directions, means for supplying a cleaning fluid to the interior of the discs, and a plurality of hard steel teeth having passages formed therethrough secured to the bottoms of the discs in rows which extend chordally from the inner portions of the discs to the peripheries thereof, some of the rows of teeth on one disc being moved away from some of the rows of teeth on the other disc as the discs are rotated, whereby the portion of elastic material between the rows of teeth being moved apart is stretched, the passages in the teeth connecting the interiors of the discs with the exteriors thereof, whereby the cleaning fluid flows through the passages from the interiors of the discs.

VINCENT A. RAYBURN

REFERENCES CITED

The following references are of record in the file of this patent:

UNITED STATES PATENTS

| Number | Name | Date |
|---|---|---|
| 696,134 | Crump (2) | Mar. 25, 1902 |
| 753,958 | Crump (1) | Mar. 8, 1904 |
| 861,610 | Sarver | July 30, 1907 |
| 1,038,656 | Reuter | Sept. 17, 1912 |
| 1,498,255 | Winchester | June 17, 1924 |
| 1,596,041 | Young | Aug. 17, 1926 |
| 1,927,225 | Woods | Sept. 19, 1933 |
| 1,971,790 | Mall | Aug. 28, 1934 |
| 2,003,847 | Woods | June 4, 1935 |
| 2,103,957 | Scott | Dec. 28, 1937 |
| 2,153,207 | Petty | Apr. 4, 1939 |
| 2,168,692 | Vidal | Aug. 8, 1939 |